Aug. 1, 1967     L. GROSS ET AL     3,333,551
LOW-PLATFORM RAILWAY CAR BOGIE
Filed June 6, 1966
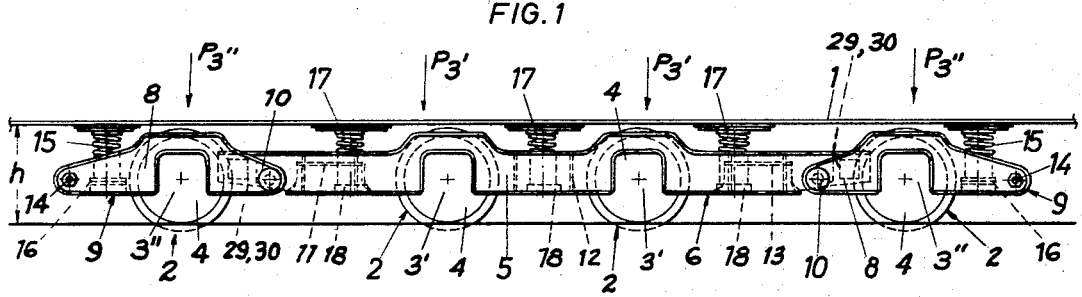
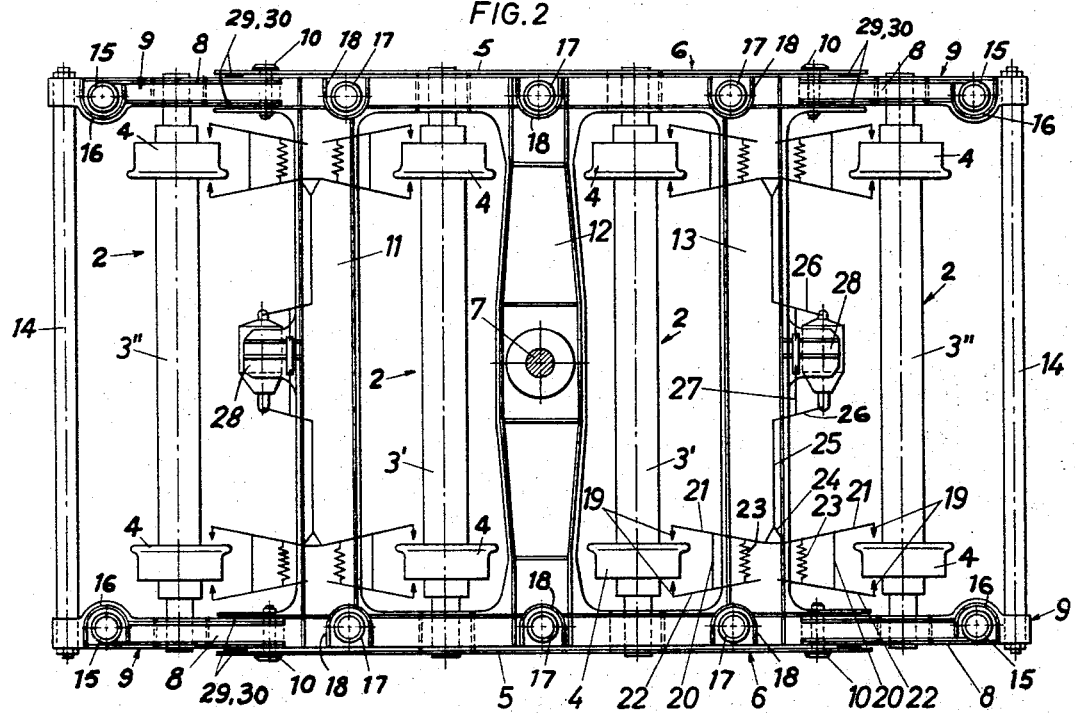
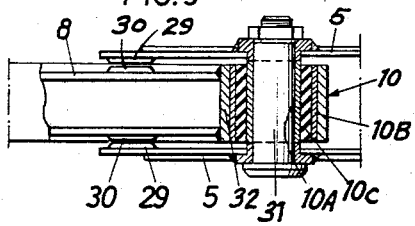
INVENTORS
LUDWIG GROSS
FRIEDRICH PELZ
BY
ATTORNEYS

United States Patent Office 3,333,551
Patented Aug. 1, 1967

3,333,551
LOW-PLATFORM RAILWAY CAR BOGIE
Ludwig Gross and Friedrich Pelz, both of Vienna, Austria, assignors to Simmering-Graz-Pauker Aktiengesellschaft fur Maschinen-, Kessel- und Waggonbau, Vienna, Austria
Filed June 6, 1966, Ser. No. 555,502
Claims priority, application Austria, June 11, 1965, A 5,280/65; Dec. 2, 1965, A 10,841/65
4 Claims. (Cl. 105—183)

This invention relates to a low-platform car, which has specially designed trucks so that the platform is on a low level and is protected from derailing when moving over diamond crossings.

It is an important object of the invention to reduce the sensitivity of the truck to irregularities of the track. For this purpose, each truck has a frame, in which at least three axles are mounted, each of which is provided adjacent to both sides of the frame with a wheel having a tread diameter of at most 13¾ inches, at least one of the two end parts of the frame spaced apart in the direction of travel is pivotally movable about an axis which is transverse to the direction of travel; said end part is articulatedly connected to the remaining part of the frame; at least two axles are rotatably mounted in said remaining part of the frame; at least one axle is rotatably mounted in said pivoted part; and each of said parts of the frame supports said underframe of the low-platform car by separate springs associated with such part.

Another object of the invention is to ensure that the wheel which is just moving across the gap of the crossing is reliably guided.

Experience has shown that the sensitivity to track irregularities will be minimized if the contact points of the wheels on the axles of the rigid frame part are closely spaced. To accomplish this object, the spacing of those axles which are mounted in the rigid frame part is, according to the invention, less than their distance from the outer axles and less than one half of the gauge.

The protection against derailing is further improved by a particularly favorable relation of the forces acting on the leading wheel. For this purpose, it is a further feature of the invention that the pressure on the guiding outer axles is higher than that on the intermediate axles.

Further features of the invention will be explained with reference to the drawing, which shows by way of example an embodiment of the low-platform car according to the invention.

FIG. 1 is an elevation showing part of the car,
FIG. 2 is a top plan view of the car of FIG 1 and
FIG. 3 is an enlarged view showing a detail of FIG. 2.

FIG. 1 shows only that portion of platform 1 which covers one of the two trucks. The height $h$ of the floor of the low-platform car is 15¾ inches or less. The truck has four wheel sets 2. Each wheel set comprises an axle 3' or 3" and two wheels 4 having a diameter of or less than 13¾ inches. The two inner axles 3' are mounted in longitudinal side members 5 of a rigid frame part 6, which is connected by a pivot pin 7 to the underframe of the car. The two outer axles 3" are mounted in longitudinal side members 8 of separate frame parts 9, which are mounted by cushioning blocks 10 on the rigid frame part for vertical pivotal movement relative thereto. The spacing of the axles 3' which are mounted in the rigid frame part 6 is less than the distance of these axles from the outer axles 3". The spacing of the two axles 3' is less than one half of the gauge. The arrangement of the parts is such that the pressure $P_{3''}$ on each of the outer axles 3" is greater than the pressures $P_{3'}$ on the intermediate axles 3'. In the specific example shown, the springs 15 which transmit the platform or underframe load to the axles 3" are positioned on those sides of the axles 3" beyond the cushioning blocks 10 and thus effectively increase the pressures $P_{3''}$ as compared to positioning of these springs above the axles 3" or inwardly thereof toward the pivotal axes defined by the cushioning blocks 10. Six springs 17 are shown transmitting the platform load to the frame 3 and its associated axles 3', equivalent to three springs per axle 3' whereas only two springs 15 are associated with each axle 3". However, the aforesaid positioning of the springs 15 relative to axles 3" and cushioning blocks 10, taken in conjunction with the relative springs between the several axles is such as to cause each pressure $P_{3''}$ to be greater than the pressures $P_{3'}$. In this way, the leading frame (in the direction of travel) is not so apt to be derailed by track irregularities. The cushioning blocks 10, as best shown in FIG. 3, comprise two concentric sleeves 10A, 10B concentrically spaced with a rubber bushing 10C bonded therebetween, the sleeve 10A being mounted on a pin 31 carried by the frame 5 and the sleeve 10B being surrounded by a jacket 32 welded to the frame 8. Thus, the cushioning block 10 provides a universal joint so that the outer axles 3" can assume a skew position relative to the inner axle 3'. The outer frame part 9 is capable of a limited axial displacement relative to the intermediate frame part 6. For this purpose, the longitudinal sid emembers 5 of frame part 6 extend beyond the cushioning block and have on the inside a slide plate 29, which is slightly spaced, suitably by about .040 inch, from the opposite slide plate 30, which is secured to the longitudinal member 8 of the pivoted frame part 9. Slide plates 29, 30 consist of a wear-resisting material, such as austenitic manganese steel. This enables an absorption of substantial horizontal shock forces, as may occur when entering a curve.

To avoid a climbing of the flange on a steeply curving rail and thus to improve the protection against derailing in a curve, and in order to reduce the wear of the flange, means for flange lubrication are incorporated.

The opposed longitudinal members 5 are connected by a main cross-member 12 and brake carriers 11 and 13. The main cross-member 12 receives pivot pin 7. The longitudinal members 8 of the two pivoted frame parts 9 are connected at their free ends by a bar 14. The truck supports the underframe between the wheel axles and at the ends by helical compression springs. The two outer springs 15 are contained in spring housings 16 secured to the pivoted frame part whereas the remaining springs 17 are contained in spring housings 18 of the rigid frame part. The web and the tire of the wheel form a common body. Loose wheels are not used. There is no need for spring-cushioning the individual axles relative to the truck. This applies mainly to axles 3", which are connected by the longitudinal side members 8 to the intermediate structure 5, 6, 11, 12, 13 and can thus assume any skew position relative to axles 3'. Axles 3' are closely spaced in the intermediate part of the frame. The elasticity of the rails ensure a sufficient equalization of the wheel pressures. To avoid the ned for excessively close manufacturing tolerances for the truck as well as an excessive elastic deformation of the frame, an elastic interlayer of any desired form may be incorporated between the frame and each axle bearing.

The cushioning of the individual wheels of the outer wheel sets 3" is accomplished in that cushioning blocks are incorporated not only at the articulated joints 10 but also at the free end points of separate frame part 9 where bar 14 is connected to the longitudinal side members 8. This will not result in an elastic twisting of the longitudinal side members 8 so that each of the wheels, which are pivotally movable virtually only in a vertical direction, is movable independently of the other wheels.

The braking system comprises two brake shoes 19, which are disposed on both sides of each wheel. Each brake shoe 19 is pivoted to the end of a lever 21 or 22. Levers 21 and 22 are articulately interconnected by a tie rod 20. A spring 23 disposed between the levers exerts a restoring force. The two inner levers 21 are pivoted to an equalizing member 24, which is connected by levers 25, 26 to the piston rod of a brake cylinder 28, which is mounted on brake carrier 11 or 13. A cross-bar 27 is connected to lever 26 and to the linkage which is associated with the opposite wheels belonging to the same brake system.

What is claimed is:

1. A low-platform car comprising, in combination, an underframe,
a truck assembly supporting said underframe, said truck assembly including first and second frames,
a pair of axles journalled on said first frame and each having a pair of wheels disposed in predetermined spaced relation, said axles being spaced from each other by an amount less than half the predetermined spacing between the wheels of each pair, whereby to minimize sensitivity to track irregularities,
a third axle journalled on said second frame and having a pair of wheels disposed in said predetermined spacing, said third axle being spaced from the nearest of said pair of axles by an amount greater than the spacing between said pair of axles,
cushioning means connecting the adjacent ends of said frames and accommodating relative universal movement therebetween,
and spring means interposed directly between said frames and said underframe.

2. The car as defined in claim 1 wherein said spring means comprises separate springs interposed between each frame and the underframe, the springs interposed between said second frame and the underframe transmitting a greater share of the load to said third axle than the springs interposed between the first frame and the underframe transmit to said pair of axles, 3. A low-platform car comprising, in combination, an underframe,
a truck assembly supporting said underframe, said truck assembly including a first frame and a second frame pivotally attached to one end of said first frame about a horizontal axis,
a pair of axles journalled on said first frame parallel to each other and to said horizontal axis, a pair of wheels on each axle,
a third axle journalled on said second frame in spaced parallel relation to said horizontal axis and having a pair of wheels thereon,
spring means interposed between said first frame and said underframe,
separate spring means interposed directly between said second frame and said underframe and in spaced relation to said third axle on the side thereof opposite to said horizontal axis,
cushioning means connecting the adjacent ends of said frames and accommodating relative universal movement therebetween.

4. The car as defined in claim 3 wherein each pair of wheels is spaced apart a predetermined distance, said pair of axles being spaced apart by an amount less than half said predetermined distance, and said third axle being spaced from the nearest axle of said pair of axles by an amount greater than the spacing between said axles.

References Cited
UNITED STATES PATENTS

| | | | |
|---|---|---|---|
| 158,262 | 12/1874 | Eaton | 105—248 |
| 2,216,093 | 9/1940 | Orr | 105—183 |
| 2,235,214 | 3/1941 | Johnson et al. | 105—183 |
| 2,242,371 | 5/1941 | Orr | 105—183 |

ARTHUR L. LA POINT, *Primary Examiner.*

H. BELTRAN, *Assistant Examiner.*